United States Patent
Lee et al.

(10) Patent No.: US 10,379,675 B2
(45) Date of Patent: Aug. 13, 2019

(54) INTERACTIVE PROJECTION APPARATUS AND TOUCH POSITION DETERMINING METHOD THEREOF

(71) Applicants: Cheng-Shen Lee, Hsin-Chu (TW); Lien-Fu Cheng, Hsin-Chu (TW); Chih-Neng Tseng, Hsin-Chu (TW)

(72) Inventors: Cheng-Shen Lee, Hsin-Chu (TW); Lien-Fu Cheng, Hsin-Chu (TW); Chih-Neng Tseng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 134 days.

(21) Appl. No.: 14/561,174

(22) Filed: Dec. 4, 2014

(65) Prior Publication Data
US 2015/0261383 A1 Sep. 17, 2015

(30) Foreign Application Priority Data
Mar. 13, 2014 (CN) .......................... 2014 1 0092244

(51) Int. Cl.
*G06F 3/042* (2006.01)
*G06F 3/041* (2006.01)

(52) U.S. Cl.
CPC ............ *G06F 3/042* (2013.01); *G06F 3/0416* (2013.01)

(58) Field of Classification Search
CPC ...................... G06F 3/0425; G06F 3/042–0428
See application file for complete search history.

(56) References Cited

U.S. PATENT DOCUMENTS

| 2002/0042699 | A1 | 4/2002 | Tanaka et al. |
| 2003/0011566 | A1* | 1/2003 | Gomi ................. G06F 3/0425 345/157 |
| 2007/0290995 | A1* | 12/2007 | Ting ................... G06F 3/0386 345/157 |
| 2011/0109554 | A1* | 5/2011 | Boissier ............ G06F 3/03545 345/166 |
| 2012/0182216 | A1* | 7/2012 | Takamatsu ............ G06F 3/005 345/157 |

FOREIGN PATENT DOCUMENTS

| CN | 101907954 | 12/2010 |
| CN | 102799317 | 11/2012 |
| CN | 101882032 | 4/2013 |
| CN | 103096007 | 5/2013 |
| CN | 103369211 | 10/2013 |
| JP | 2012133487 | 7/2012 |
| TW | I408570 | 9/2013 |

OTHER PUBLICATIONS

"Office Action of China Counterpart Application," dated Jun. 2, 2017, p. 1-p. 9, in which the listed references were cited.

* cited by examiner

*Primary Examiner* — Hang Lin
(74) *Attorney, Agent, or Firm* — JCIPRNET

(57) ABSTRACT

An interactive projection apparatus and a touch position determining method thereof are provided. The invention adopts such a scheme of defining the effective touch area according to the coordinate information of the positioning pattern and judging whether or not the light spot is located in the effective touch area. If the light spot is located in the effective touch area, the position of the light spot is taken as the touch position of an input tool.

13 Claims, 6 Drawing Sheets

INTERACTIVE PROJECTION APPARATUS AND TOUCH POSITION DETERMINING METHOD THEREOF

CROSS-REFERENCE TO RELATED APPLICATION

This application claims the priority benefit of China application serial no. 201410092244.7, filed on Mar. 13, 2014. The entirety of the above-mentioned patent application is hereby incorporated by reference herein and made a part of this specification.

BACKGROUND OF THE INVENTION

Field of the Invention

The invention generally relates to a display apparatus, and more particularly, to an interactive projection apparatus and a touch position determining method thereof.

Description of Related Art

In the current touch projection apparatus, an infrared laser curtain (IR laser curtain) can be employed to overlay the screen in parallel. When the user's finger or the stylus of a touch pen touches the screen, the light beam of the IR laser curtain would be reflected to an infrared sensor. At the time, the position of the user's finger or the stylus of touch pen on the screen can be decided through the IR image sensed by the infrared sensor. Since the IR image sensed by the infrared sensor may come from the stray light caused by other ambient light sources, the aforementioned judgement could be interfered so as to affect the interactive operation between the user and the touch projection apparatus.

Patents related to the touch projection apparatus are China Patent Nos. 103369211, 102799317 and 103096007 and Taiwan Patent No. I408570.

SUMMARY OF THE INVENTION

Accordingly, the invention is directed to an interactive projection apparatus and a touch position determining method thereof are provided to avoid the judgment of the touch position of the interactive projection apparatus being interfered by the ambient light.

Other objects and advantages of the invention should be further indicated by the disclosures of the invention.

To achieve one of, a part of or all of the above-mentioned objectives, or to achieve other objectives, an embodiment of the invention provides an interactive projection apparatus, which includes a projection unit, a photosensitive unit and a control unit. The projection unit herein projects a positioning beam onto a surface to form a positioning pattern, the photosensitive unit has a sensing area and the photosensitive unit senses the positioning pattern in the sensing area. The control unit is coupled to the projection unit and the photosensitive unit, calculates a coordinate information of the positioning pattern and defines an effective touch area according to the coordinate information of the positioning pattern, in which when the photosensitive unit senses a light spot in the sensing area, the control unit decides whether or not the light spot is located in the effective touch area. If the light spot is located in the effective touch area, a position of the light spot serves as a touch position of an input tool; if the light spot is not located in the effective touch area, the light spot is ignored.

In an embodiment of the invention, the above-mentioned photosensitive unit includes a visible-light mode and an invisible-light mode, and when the photosensitive unit is in the invisible-light mode, the photosensitive unit can sense light spots in the sensing area.

In an embodiment of the invention, when the photosensitive unit is in the visible-light mode, the control unit further controls the projection unit according to an adjustment instruction to adjust the projected positioning pattern and to calculate the coordinate information of the positioning pattern so as to change the effective touch area defined by the coordinate information of the positioning pattern.

In an embodiment of the invention, the above-mentioned photosensitive unit further senses a plurality of positioning light spots on a plurality of position marks indicated by the positioning pattern, the control unit calculates the coordinate information of the positioning pattern according to the positioning light spots and defines the effective touch area, in which the photosensitive unit is in the invisible-light mode and the positioning light spots are invisible light.

In an embodiment of the invention, the above-mentioned positioning pattern includes four dots, and the four dots define the effective touch area of a rectangle.

In an embodiment of the invention, the above-mentioned positioning pattern includes a plurality of segments and the segments define the effective touch area of a rectangle.

In an embodiment of the invention, the surface is a projection screen or an electronic whiteboard.

A method for determining the touch position of an interactive projection apparatus is also provided by an embodiment of the invention. The method includes following steps: projecting a positioning beam onto a surface and forming a positioning pattern at the surface; sensing the positioning pattern in a sensing area; calculating the coordinate information of the positioning pattern; defining an effective touch area according to the coordinate information of the positioning pattern; sensing a light spot in the sensing area; judging whether or not the light spot is located in the effective touch area; if the light spot is located in the effective touch area, taking the position of the light spot as the touch position of an input tool; and if the light spot is not located in the effective touch area, ignoring the light spot.

In an embodiment of the invention, the above-mentioned method for determining the touch position of an interactive projection apparatus further includes following steps: switching to a visible-light mode; judging whether or not receiving an adjustment instruction; and if receiving the adjustment instruction, adjusting the projected positioning pattern according to the adjustment instruction and calculating the coordinate information of the positioning pattern so as to change the effective touch area defined by the coordinate information of the positioning pattern.

In an embodiment of the invention, the above-mentioned step of defining the effective touch area according to the coordinate information of the positioning pattern further includes: switching to an invisible-light mode; sensing a plurality of positioning light spots on a plurality of position marks indicated by the positioning pattern; and calculating the coordinate information of the positioning pattern according to the positioning light spots and defining the effective touch area, in which the positioning light spots are invisible light.

In an embodiment of the invention, the above-mentioned positioning pattern includes four dots, and the four dots define the effective touch area of a rectangle.

In an embodiment of the invention, the above-mentioned positioning pattern includes a plurality of segments and the segments define the effective touch area of a rectangle.

In an embodiment of the invention, the above-mentioned surface is a projection screen or an electronic whiteboard.

Based on the depiction above, the embodiments of the invention define an effective touch area according to the coordinate information of the positioning pattern and judge whether or not the light spot is located in the effective touch area. If the light spot is located in the effective touch area, the position of the light spot is taken as the touch position of an input tool to avoid the judgment of the touch position of the interactive projection apparatus from interference of ambient light and from affecting the interactive operation between the user and the interactive projection apparatus.

In order to make the features and advantages of the present invention more comprehensible, the present invention is further described in detail in the following with reference to the embodiments and the accompanying drawings.

DESCRIPTION OF THE EMBODIMENTS

The above-mentioned or other relevant technical principles and the features and effects thereof are clearly presented together with the accompanying drawings in the following depicted embodiments. Note that some of expression words hereinafter regarding direction or orientation, such as 'up', 'down', 'front', 'behind', 'left', 'right', and the like, are to describe, not to limit, the present invention.

Figure 1:
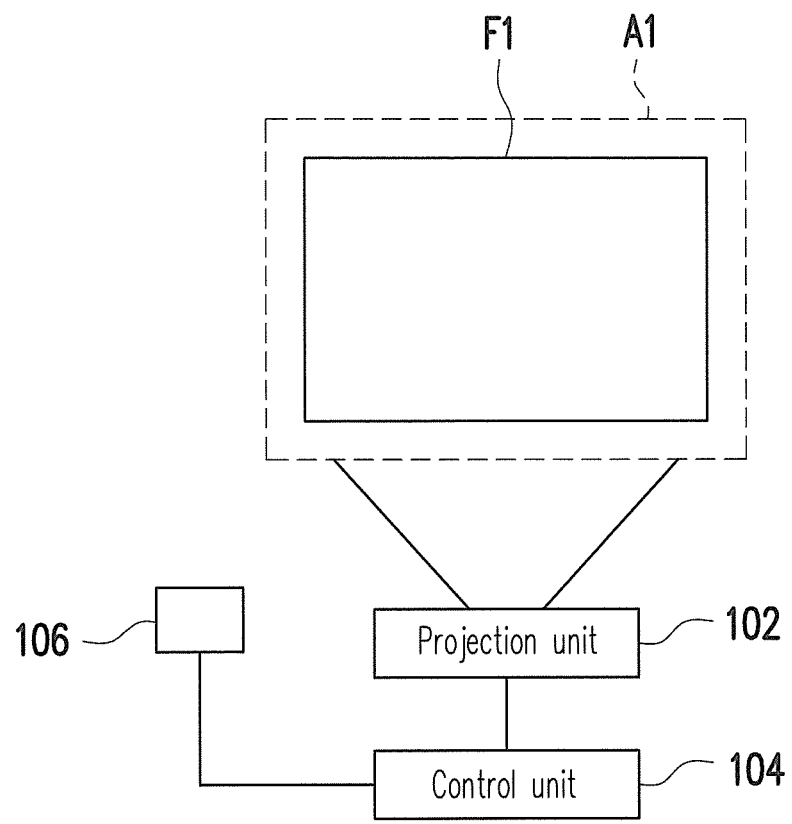
FIG. 1 is a schematic diagram of an interactive projection apparatus according to an embodiment of the invention.

FIG. 1 is a schematic diagram of an interactive projection apparatus according to an embodiment of the invention. Referring to FIG. 1, an interactive projection apparatus includes a projection unit 102, a control unit 104 and a photosensitive unit 106. The control unit 104 is coupled to the projection unit 102 and the photosensitive unit 106. The projection unit 102 projects a positioning beam onto a surface F1 to form a positioning pattern on the surface F1, wherein the surface F1 can be, for example, a projection screen or an electronic whiteboard, which the invention is not limited to and can be, for example, a wall surface or other surfaces suitable to be projected. Prior to performing touch operation on the interactive projection apparatus, the control unit 104 controls the projection unit 102 to project the positioning pattern on the surface F1 for indicating an input tool to perform a step of defining an effective touch area. As shown by a positioning pattern according to an embodiment of the invention in FIG. 2A, the positioning pattern can include multiple dots C1-C5, in which the dots C1-C4 can be respectively located at four corners of a rectangle. By using the control unit 104 to calculate the coordinate information of the dots C1-C4, an effective touch area Z1 in a rectangular shape can be defined. In addition, the dot C5 is used to indicate the direction of the frame projected by the projection unit 102 so as to avoid upside down of the projection frame or incorrect definition of the effective touch area Z1 to cause mistake of calculating the touch position. In some embodiments herein, the positioning pattern can include four dots C1-C4 only without the dot C5. In addition, the input tool can be, for example, the user's finger or a touch pen, which the invention is not limited to. The interactive projection apparatus can also include an invisible-light module (not shown) for producing an invisible light curtain parallel to the surface F1. The invisible light curtain covers the whole effective touch area. The photosensitive unit 106 has a sensing area A1 (for example, the area within the dotted lines in FIG. 1). The sensing area A1 is greater than or equal to the projection area on the surface F1 by the projection unit 102. The photosensitive unit 106 performs optical sensing in the sensing area A1, for example, the photosensitive unit 106 of the embodiment can sense the positioning pattern projected by the projection unit 102.

The control unit 104 can calculate the coordinate information of the positioning pattern according to the sensing result of the photosensitive unit 106. The size of the effective touch area Z1 is adjustable depending on the actual situation, for example, the size is adjusted according to the size of the projection screen or the electronic whiteboard or according to the stray light produced by the ambient light in the sensing area A1. The user can send an adjustment instruction to the control unit 104 through the input interface (for example, a physical button) of the touch projection apparatus. Then, the control unit 104 adjusts the size and the position of the positioning pattern projected by the projection unit 102 according to the received adjustment instruction and calculates the coordinate information of the positioning pattern to change the effective touch area Z1 defined by the coordinate information of the positioning pattern.

In general, since the sensing area A1 of the photosensitive unit 106 is greater than the effective touch area Z1, so that the source of light spots sensed by the photosensitive unit 106 may not only include the reflective light caused by that when the invisible light curtain encounters the input tool during the touch operation of the input tool, but may also include the stray ambient light. After defining the effective touch area Z1, the control unit 104 can decide whether or not the light spot sensed by the photosensitive unit 106 is located in the effective touch area Z1. If the light spot sensed by the photosensitive unit 106 is in the effective touch area Z1, the position of the light spot is taken as the touch position of the input tool; on contrary, if the light spot sensed by the photosensitive unit 106 is not in the effective touch area Z1, the control unit 104 can ignore the light spot sensed by the photosensitive unit 106. In this way, it can exclude interference of the ambient light to avoid the judgment of touch position of the interactive projection apparatus from the interference of the ambient light and from affecting the interactive operation between the user and the interactive projection apparatus.

Figure 3:
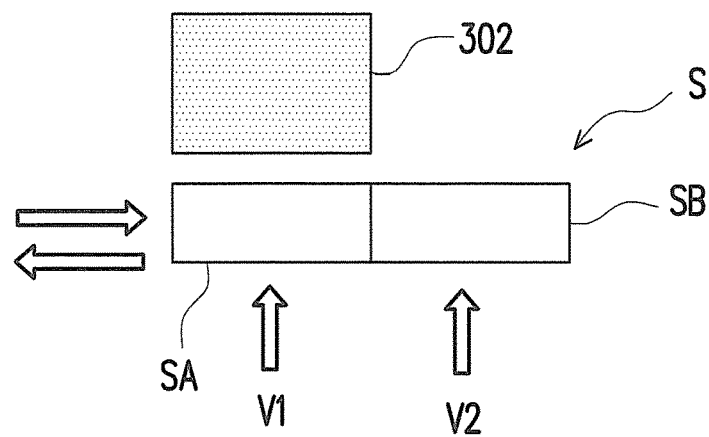
FIG. 3 is a schematic diagram of a photosensitive unit according to an embodiment of the invention.

In more details, the photosensitive unit 106 can include a visible-light mode and an invisible-light mode. FIG. 3 is a schematic diagram of a photosensitive unit according to an embodiment of the invention. Referring to FIG. 3, the photosensitive unit 106 can include a photosensitive element 302 and a shutter S movable relatively to the photosensitive element 302, in which the shutter S is, for example, an optical wavelength filter having a visible-light area SA and a invisible-light area SB. The visible-light area SA allows the visible light V1 to pass through but blocks the invisible light V2, and the invisible-light area SB allows the invisible light V2 to pass through but blocks the visible light V1. The photosensitive element 302 can be, for example, a complementary metal oxide semiconductor (CMOS) sensor. When the photosensitive unit 106 is switched to the visible-light mode, the visible-light area SA of the shutter S is moved to a front position of the photosensitive element 302 so that the visible light V1 passes through the visible-light area SA to be received by the photosensitive element 302. When the photosensitive unit 106 is switched to the invisible-light mode, the invisible-light area SB of the shutter S is moved to a front position of the photosensitive element 302 so that the invisible light V2 passes through the invisible-light area SB to be received by the photosensitive element 302, wherein the invisible light V2 can be, for example, infrared (IR) light.

In the aforementioned embodiment, when the photosensitive unit 106 is operated to sense the positioning pattern, the photosensitive unit 106 is switched to the visible-light mode, while when the photosensitive unit 106 is operated to sense the touch of the input tool in the effective touch area Z1, the photosensitive unit 106 is switched to the invisible-light mode so as to sense the light spot caused by that the input tool reflects the invisible light curtain. It should be noted that in partial embodiments, when the photosensitive unit 106 is operated to sense the positioning pattern, the photosensitive unit 106 can be also switched to the invisible-light mode. At the time, the positioning pattern formed by the projection unit 102 to project the beam on the surface F1 is shown by, for example, FIG. 2B where the positioning pattern can include four position marks T1-T4, in which the position marks T1-T4 can be respectively located at four corners of a rectangle. The user uses an input tool to sequentially (following the sequence of the arrow symbols in FIG. 2B) perform click operation at the position marks T1-T4 and to reflect the invisible light curtain following the clicking sequence, the photosensitive unit 106 can sense the positioning light spots corresponding to the position marks T1-T4; or by using a laser pen emitting invisible light to sequentially click the position marks T1-T4 at the positioning pattern and to reflect the light of the laser pen following the clicking sequence, the photosensitive unit 106 can sense the positioning light spots corresponding to the position marks T1-T4. As a result, the photosensitive unit 106 in the invisible-light mode can sense the positioning light spots used to define the effective touch area Z1. The control unit 104 calculates the coordinate information of the position marks T1-T4 of the positioning pattern according to the positioning light spots sensed by the photosensitive unit 106 and defines the effective touch area Z1.

Figure 2A:
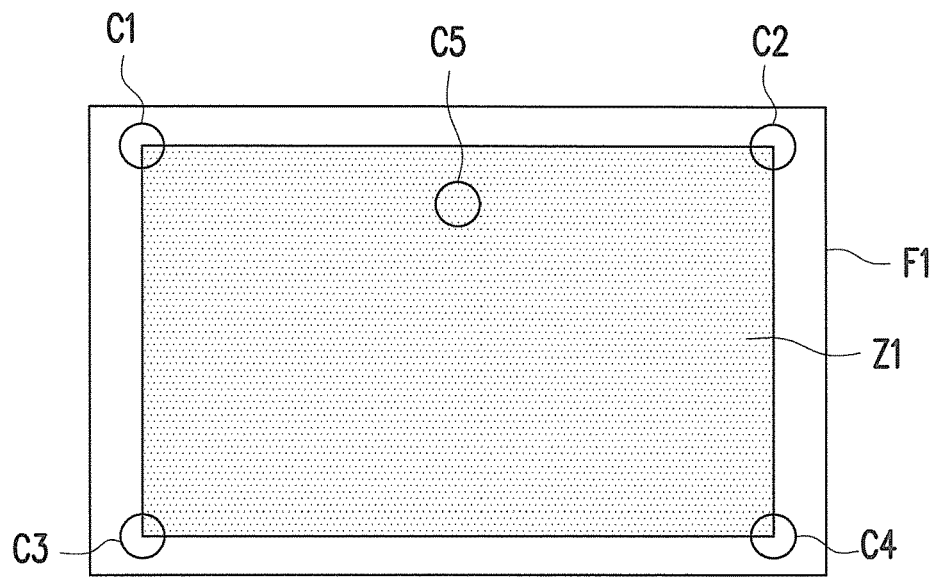
FIGS. 2A-2C are schematic diagrams of the positioning patterns in the embodiments of the invention.
Figure 2B:
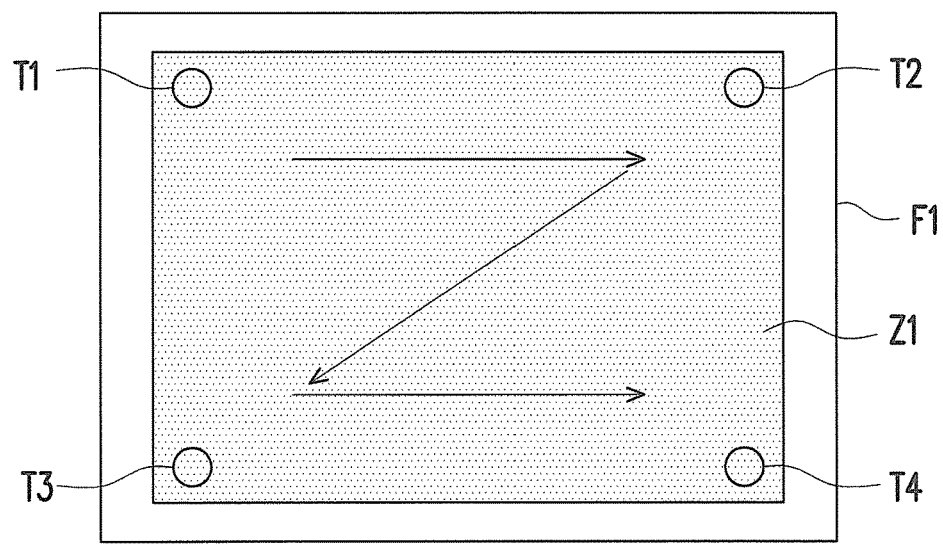
Figure 2C:
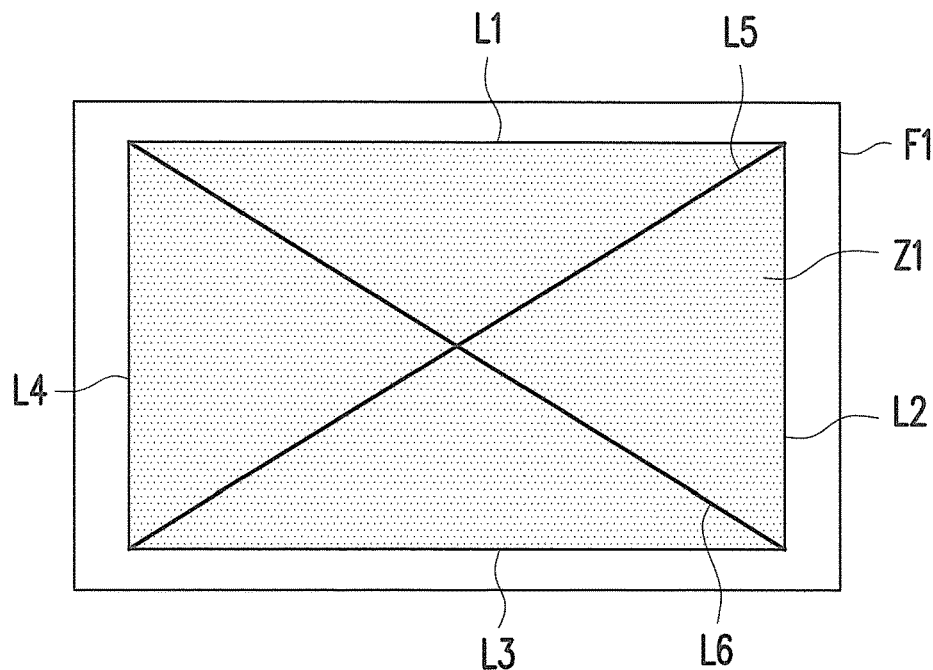

In other embodiments, the positioning pattern is not limited to the dots C1-C5 of FIG. 2A or the position marks T1-T4 of FIG. 2B. As shown by a positioning pattern according to another embodiment of the invention in FIG. 2C, the positioning pattern can be composed of a plurality of segments L1-L6, wherein the segments L1-L4 define an effective touch area Z1 of a rectangle similar to FIGS. 2A and 2B. The segments L5 and L6 are the diagonals of the rectangular effective touch area Z1 formed by the segments L1-L4. Similarly, the control unit 104 can take the position of the light spot as the touch position of the input tool if the position of the light spot is located in the effective touch area Z1, and the control unit 104 can ignore the light spot sensed by the photosensitive unit 106 if the position of the light spot is not located in the effective touch area Z1, so as to exclude the interference of the ambient light and to avoid the judgment of touch position of the interactive projection apparatus from the interference of the ambient light. Since the judgment method of the touch position in FIG. 2C is quite similar to the aforementioned embodiments except the different positioning pattern, it is omitted to describe.

Figure 4:
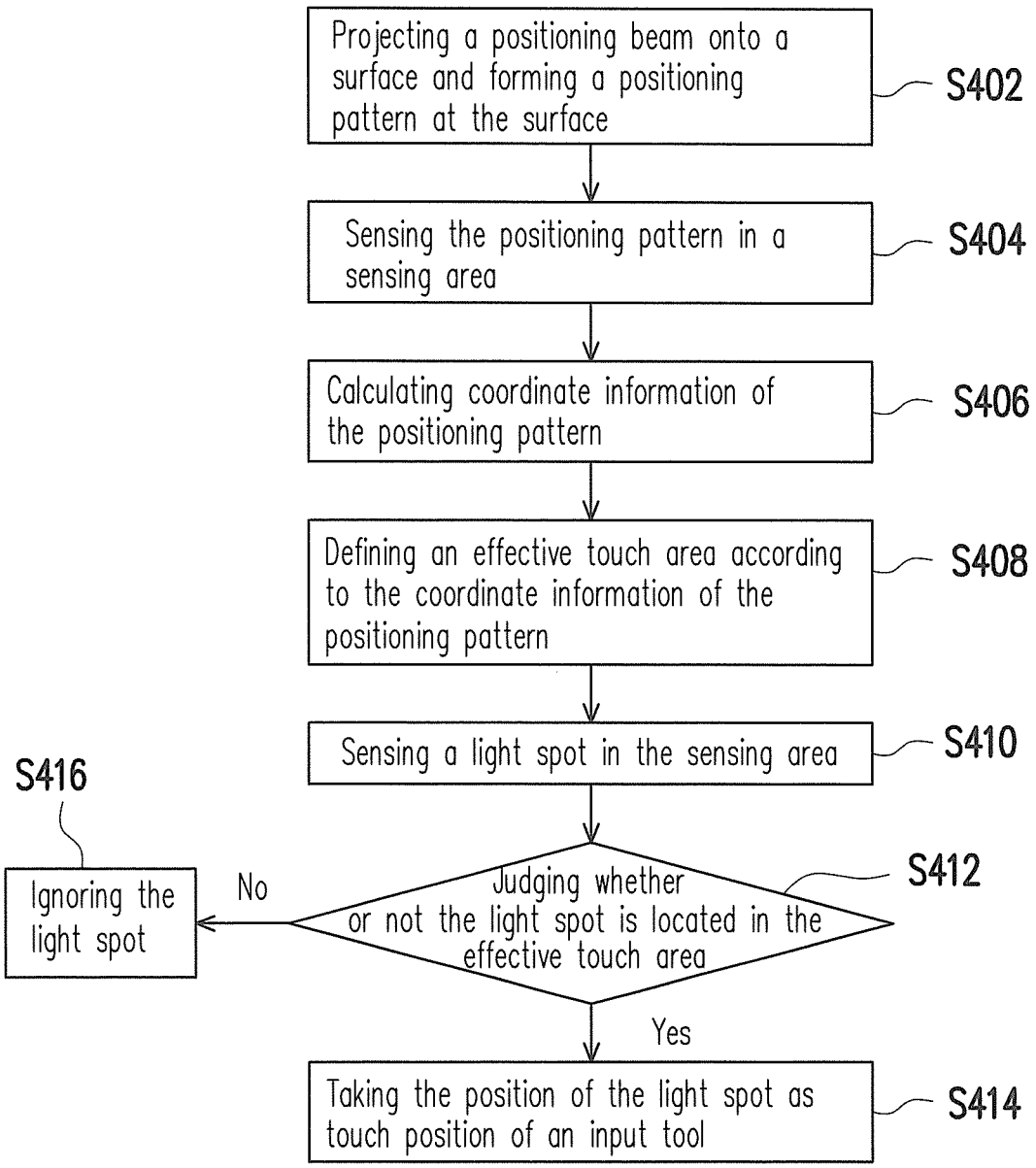
FIG. 4 is a schematic flowchart of a touch position determining method of an interactive projection apparatus according to an embodiment of the invention.

FIG. 4 is a schematic flowchart of a touch position determining method of an interactive projection apparatus according to an embodiment of the invention. Referring to FIG. 4, the aforementioned touch position determining method of an interactive projection apparatus can be summarized to following steps. First, a positioning beam is projected onto a surface to form a positioning pattern on the surface (step S402), wherein the surface is, for example, a projection screen or an electronic whiteboard. Next, the positioning pattern is sensed in a sensing area of a photosensitive unit (step S404). Then, the coordinate information of the positioning pattern is calculated (step S406) and an effective touch area is defined by the coordinate information of the positioning pattern (step S408), wherein the positioning pattern includes, for example, four dots, and the four dots are respectively located at the four corners of the rectangle. By calculating the coordinate information of the dots, the rectangular effective touch area can be defined. In partial embodiments, the positioning pattern includes, for example, a plurality of segments and the segments define the rectangular effective touch area. After defining the effective touch area, the light spot in the sensing area is sensed (step S410), followed by judging whether or not the light spot is located in the effective touch area (step S412). If the light spot is located in the effective touch area, the position of the light spot is taken as the touch position of the input tool (step S414); if the light spot is not located in the effective touch area, the light spot is ignored (step S416).

Figure 5:
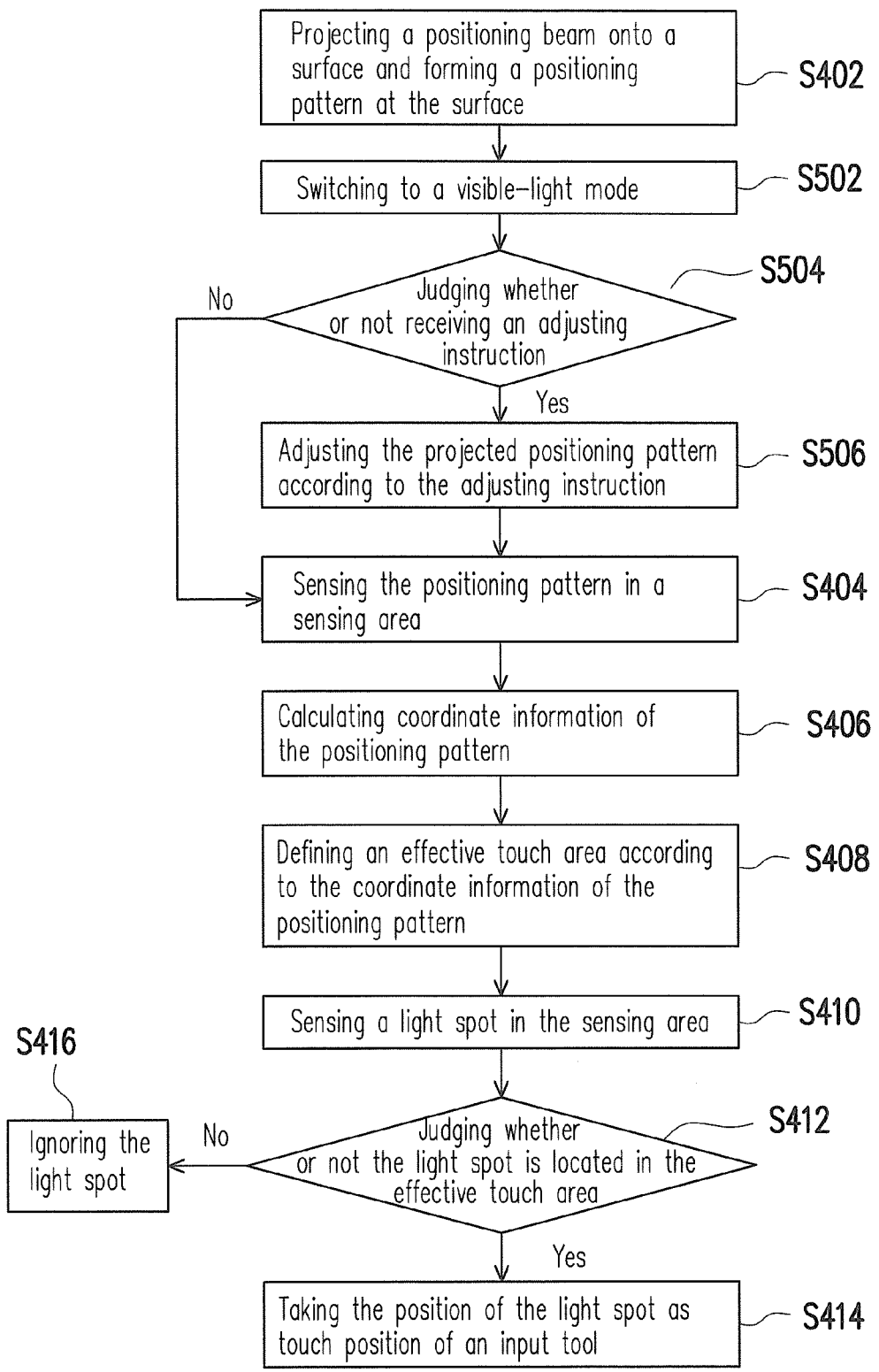
FIG. 5 is a schematic flowchart of a touch position determining method of an interactive projection apparatus according to another embodiment of the invention.

FIG. 5 is a schematic flowchart of a touch position determining method of an interactive projection apparatus according to another embodiment of the invention. Referring to FIG. 5, the difference of the embodiment from the embodiment of FIG. 4 rests in that the embodiment further includes steps S502-S506. After step S402, the photosensitive unit is switched to the visible-light mode (step S502). Then, it is judged whether or not an adjustment instruction of the positioning pattern is received (step S504). If the adjustment instruction is received, the projected positioning pattern is adjusted according to the adjustment instruction (step S506). Then it goes to step S404, followed by the step of calculating the coordinate information of the positioning pattern and the step of changing the effective touch area defined by the coordinate information of the positioning pattern. On contrary, if the adjustment instruction is not received, it directly goes to step S404. For the steps after step S404 can refer to the depiction in the embodiment of FIG. 4, which is omitted to describe.

Figure 6:
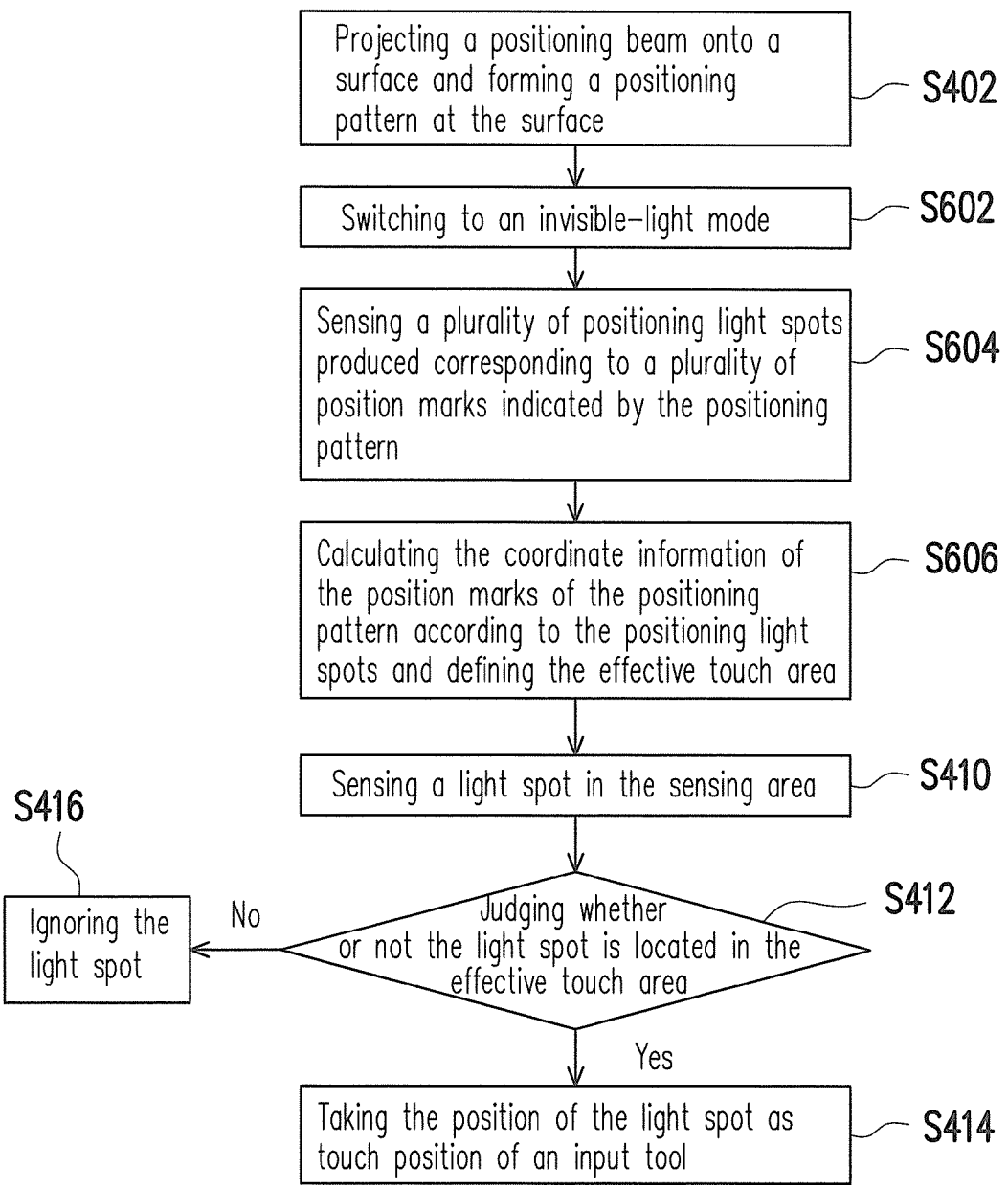
FIG. 6 is a schematic flowchart of a touch position determining method of an interactive projection apparatus according to yet another embodiment of the invention.

FIG. 6 is a schematic flowchart of a touch position determining method of an interactive projection apparatus according to yet another embodiment of the invention. Referring to FIG. 6, the difference of the embodiment from the embodiment of FIG. 4 rests in that steps S404-S408 of FIG. 4 are replaced by steps S602-S606. After step S402, the photosensitive unit is switched to the invisible-light mode (step S602). Then a plurality of positioning light spots produced corresponding to a plurality of position marks indicated by the positioning pattern are sensed (step S604), wherein the positioning light spots are invisible light. Then, the coordinate information of the position marks of the positioning pattern is calculated according to the positioning light spots and the effective touch area is defined (step S606). Then, it goes to the same steps S410-S416 of the touch position determining method of an interactive projection apparatus in the embodiment of FIG. 4. For the steps after steps S410-S416, it can refer to the depiction in the embodiment of FIG. 4, which is omitted to describe.

In summary, the invention adopts the scheme of defining the effective touch area according to the coordinate information of the positioning pattern and judging whether or not the light spot is located in the effective touch area. If the light spot is located in the effective touch area, the position of the light spot is taken as the touch position of an input tool to avoid the judgment of the touch position of the interactive projection apparatus from the interference of ambient light and from affecting the interactive operation between the user and the interactive projection apparatus.

It will be apparent to those skilled in the art that the descriptions above are several preferred embodiments of the present invention only, which does not limit the implementing range of the present invention. Various modifications and variations can be made to the structure of the present invention without departing from the scope or spirit of the invention. In addition, any one of the embodiments or claims of the present invention is not necessarily achieve all of the above-mentioned objectives, advantages or features. The abstract and the title herein are used to assist searching the documentations of the relevant patents, not to limit the claim scope of the present invention. Some of expression words hereinafter such as 'first', 'second', and the like, are to describe the part names, not to limit the upper limit or lower limit of the quantity of those parts in the present invention.

What is claimed is:

1. An interactive projection apparatus, comprising a projection unit, a photosensitive unit and a control unit, wherein the projection unit projects a positioning beam onto a surface to form a positioning pattern, the photosensitive unit has a sensing area, the photosensitive unit senses the positioning pattern in the sensing area, and the control unit is coupled to the projection unit and the photosensitive unit, calculates a coordinate information of the positioning pattern and defines an effective touch area according to the coordinate information of the positioning pattern, wherein when the photosensitive unit senses a light spot in the sensing area, the control unit decides whether or not the light spot is located in the effective touch area, when the light spot is located in the effective touch area, a position of the light spot serves as a touch position of an input tool; when the light spot is not located in the effective touch area, the control unit does not respond to the light spot to perform any operation, wherein the effective touch area is capable of operating after a size of the rectangular effective touch area is adjusted according to a stray light produced by an ambient light in the sensing area, wherein the positioning pattern includes four dots defining a substantial rectangle and a fifth dot indicating the direction of a frame projected by the projection unit so as to avoid upside down of the projection frame.

2. The interactive projection apparatus as claimed in claim 1, wherein the photosensitive unit comprises a visible-light mode and an invisible-light mode, and when the photosensitive unit is in the invisible-light mode, it senses the light spot at the sensing area.

3. The interactive projection apparatus as claimed in claim 2, wherein when the photosensitive unit is in the visible-light mode, the control unit further controls the projection unit according to an adjustment instruction to adjust the projected positioning pattern and to calculate the coordinate information of the positioning pattern so as to change the effective touch area defined by the coordinate information of the positioning pattern.

4. The interactive projection apparatus as claimed in claim 2, wherein the photosensitive unit further senses a plurality of positioning light spots on a plurality of position marks indicated by the positioning pattern, the control unit calculates the coordinate information of the positioning pattern according to the positioning light spots and defines the effective touch area, wherein the photosensitive unit is in the invisible-light mode and the positioning light spots are invisible-light.

5. The interactive projection apparatus as claimed in claim 1, wherein the positioning pattern comprises four dots, and the four dots define the effective touch area of a rectangle.

6. The interactive projection apparatus as claimed in claim 1, wherein the positioning pattern comprises a plurality of segments and the segments define the effective touch area of a rectangle.

7. The interactive projection apparatus as claimed in claim 1, wherein the surface is a projection screen or an electronic whiteboard.

8. A touch position determining method of an interactive projection apparatus, comprising:
    projecting a positioning beam onto a surface and forming a positioning pattern at the surface;
    sensing the positioning pattern in a sensing area;
    calculating coordinate information of the positioning pattern;
    defining an effective touch area according to the coordinate information of the positioning pattern;
    sensing a light spot in the sensing area;
    judging whether or not the light spot is located in the effective touch area;
    when the light spot is located in the effective touch area, taking a position of the light spot as a touch position of an input tool; and
    when the light spot is not located in the effective touch area, no operation is performed in response to the light spot that is not located in the effective touch area,
    wherein the effective touch area is capable of operating after a size of the rectangular effective touch area is adjusted according to a stray light produced by an ambient light in the sensing area, wherein the positioning pattern includes four dots defining a substantial rectangle and a fifth dot indicating the direction of a frame projected by the projection unit so as to avoid upside down of the projection frame.

9. The touch position determining method of an interactive projection apparatus as claimed in claim 8, further comprising:
    switching to a visible-light mode;
    judging whether or not receiving an adjustment instruction; and
    if receiving the adjustment instruction, adjusting the projected positioning pattern according to the adjustment instruction and calculating the coordinate information of the positioning pattern so as to change the effective touch area defined by the coordinate information of the positioning pattern.

10. The touch position determining method of an interactive projection apparatus as claimed in claim 8, wherein the step of defining the effective touch area according to the coordinate information of the positioning pattern further comprises:
    switching to an invisible-light mode;
    sensing a plurality of positioning light spots on a plurality of position marks indicated by the positioning pattern; and calculating the coordinate information of the positioning pattern according to the positioning light spots and defining the effective touch area, wherein the positioning light spots are invisible light.

11. The touch position determining method of an interactive projection apparatus as claimed in claim 8, wherein the positioning pattern comprises four dots, and the four dots define the effective touch area of a rectangle.

12. The touch position determining method of an interactive projection apparatus as claimed in claim 8, wherein the positioning pattern comprises a plurality of segments and the segments define the effective touch area of a rectangle.

13. The touch position determining method of an interactive projection apparatus as claimed in claim 8, wherein the surface is a projection screen or an electronic whiteboard.

\* \* \* \* \*